(12) United States Patent
Ambrefe, Jr.

(10) Patent No.: US 7,633,390 B2
(45) Date of Patent: *Dec. 15, 2009

(54) ADVERTISING TRAYS FOR SECURITY SCREENING

(75) Inventor: Joseph T. Ambrefe, Jr., West Chester, PA (US)

(73) Assignee: SecurityPoint Holdings LLC, St. Petersburg, FL (US)

( * ) Notice: Subject to any disclaimer, the term of this patent is extended or adjusted under 35 U.S.C. 154(b) by 317 days.

This patent is subject to a terminal disclaimer.

(21) Appl. No.: 11/070,094

(22) Filed: Mar. 3, 2005

(65) Prior Publication Data

US 2005/0173284 A1 Aug. 11, 2005

Related U.S. Application Data

(63) Continuation of application No. 10/611,430, filed on Jul. 2, 2003, now Pat. No. 6,888,460.

(60) Provisional application No. 60/393,637, filed on Jul. 3, 2002.

(51) Int. Cl.
G08B 13/00 (2006.01)
(52) U.S. Cl. ............ 340/541; 340/540; 340/5.32; 340/5.7; 340/673; 340/676; 220/660; 109/19; 52/174; 198/347.1; 198/347.4
(58) Field of Classification Search ............ 340/541, 340/540, 551, 552, 673, 676, 3.7, 5.32, 5.7, 340/7.61, 10.6, 572.1, 5.91; 220/660; 109/19; 52/174; 198/347.1, 347.4
See application file for complete search history.

(56) References Cited

U.S. PATENT DOCUMENTS

| 2,069,957 | A | 2/1937 | Klein |
|---|---|---|---|
| 2,123,257 | A | 7/1938 | Provost |
| 2,206,775 | A | 7/1940 | Hoofer |
| 2,908,985 | A | 10/1959 | Hartman |
| 3,976,369 | A | 8/1976 | McCardell et al. |
| 3,995,385 | A | 12/1976 | Clipson et al. |
| 4,137,567 | A | 1/1979 | Grube |
| 4,170,303 | A | 10/1979 | Nolan |
| 4,679,691 | A | 7/1987 | Halloran |
| 4,823,955 | A | 4/1989 | Apps |
| 4,844,264 | A | 7/1989 | Deskiewicz, Jr. |
| 4,928,411 | A | 5/1990 | Danis et al. |

(Continued)

FOREIGN PATENT DOCUMENTS

WO WO 90/03140 4/1990

(Continued)

OTHER PUBLICATIONS

Holland Patent Application Publication (U.S. Appl. No. 2003/0062373) Pub. Date on Apr. 03, 2003.*

(Continued)

*Primary Examiner*—Hung T. Nguyen
(74) *Attorney, Agent, or Firm*—Sheppard Mullin Richter & Hampton LLP (57) ABSTRACT

A system and device for use in a security area, and more particularly, a rack system and holding device for placing various objects that are processed through a security area are taught.

11 Claims, 10 Drawing Sheets

U.S. PATENT DOCUMENTS

| | | | |
|---|---|---|---|
| 5,010,668 | A | 4/1991 | Zeligson |
| 5,097,959 | A | 3/1992 | Hasegawa |
| 5,190,156 | A | 3/1993 | Conaway et al. |
| 5,329,102 | A | 7/1994 | Sansone |
| 5,337,947 | A | 8/1994 | Eskandry |
| 5,381,901 | A | 1/1995 | Hundley |
| 5,388,049 | A | 2/1995 | Sansone et al. |
| 5,390,785 | A | 2/1995 | Garric et al. |
| 5,445,397 | A | 8/1995 | Evans |
| 5,470,427 | A | 11/1995 | Mikel et al. |
| 5,566,961 | A | 10/1996 | Snell et al. |
| 5,575,375 | A | 11/1996 | Sandusky et al. |
| 5,586,493 | A | 12/1996 | McEntee |
| 5,749,305 | A | 5/1998 | Jacovelli |
| 5,841,346 | A | 11/1998 | Park |
| 5,845,692 | A | 12/1998 | Kellem et al. |
| 6,079,719 | A | 6/2000 | Tisbo et al. |
| 6,240,667 | B1 | 6/2001 | Harney et al. |
| 6,264,219 | B1 | 7/2001 | Smith |
| 6,356,802 | B1 | 3/2002 | Takehara et al. |
| 6,366,206 | B1 * | 4/2002 | Ishikawa et al. ......... 340/573.1 |
| 6,501,041 | B1 | 12/2002 | Burns et al. |
| 6,507,278 | B1 | 1/2003 | Brunetti et al. |
| 6,720,874 | B2 | 4/2004 | Fufido et al. |
| 6,745,520 | B2 | 6/2004 | Puskaric et al. |
| 6,753,830 | B2 * | 6/2004 | Gelbman ..................... 345/55 |
| 7,012,525 | B1 * | 3/2006 | Ghioto ....................... 340/552 |
| 2003/0062373 | A1 * | 4/2003 | Holland |
| 2005/0193648 | A1 * | 9/2005 | Klein et al. |

FOREIGN PATENT DOCUMENTS

| | | |
|---|---|---|
| WO | WO 99133723 | 7/1999 |
| WO | WO 02/29744 | 4/2002 |

OTHER PUBLICATIONS

"Defendants' Initial Disclosure of Prior Art and Production", pp. 1-53 (Sept. 13, 2007) Security Point Media, LLC v. The Adason Group, LLC, The Conner Group, and Stephen Conner (U.S. Dist. Ct. Middle Dist. of FL.

* cited by examiner

ADVERTISING TRAYS FOR SECURITY SCREENING

CROSS REFERENCE TO RELATED APPLICATIONS

The present application is a continuation and claims the benefit, under 35 U.S.C. § 120, of U.S. patent application Ser. No. 10/611,430, filed Jul. 2, 2003 (U.S. Pat. No. 6,888,460), and is related to and claims the benefit under 35 U.S.C. § 119(e) of U.S. Provisional Patent Application Ser. No. 60/393,637 filed Jul. 3, 2002, which is expressly incorporated fully herein by reference.

FIELD OF THE INVENTION

The present invention relates generally to a system and device for use in a security area, and more particularly, to a rack system and holding device for placing various objects which are processed through a security area.

BACKGROUND OF THE INVENTION

Security areas are typically encountered in places such as an airport security terminals, courthouse entrances and various other places where a person and their luggage or personal items may need to be searched prior to entering or leaving a particular room or area of a building. These security areas typically involve the steps of a person moving through a metal detector area and removing various items from their clothing, pockets or luggage and placing them in a separate area to be either hand checked or machine checked. It is common that people traveling through security areas, such as those in an airport security terminal, may be carrying electronic devices and in particular laptop/notebook-sized computers. These laptop computers are delicate devices which should not be dropped or jostled in an excessive amount as they can be damaged. It is very common that people traveling on business through airport security terminals will have such items sized like a laptop computer so that they can later do work on the plane. The person may have personal items such as wallets, keys, change, cell phones, PDAs and other small bags that need to be checked. These items are typically loose objects that can easily be lost or damaged if not handled in a safe manner.

After the person removes these items from their pockets they are usually placed into a tray or small container that is then either checked by the security personnel by hand or by an x-ray machine or other similar device. The trays that are typically used are non-standardized small trays. In addition, if the person has any electronic equipment such as a camera, a laptop computer or any other device with may have to be checked by the security personnel these items are sometimes put in a larger tray to be later hand checked by the security personnel or passed through an x-ray device.

A disadvantage to the present system used in security areas is that the trays for holding laptop computers are not part of a uniform system and do not protect the items from possible damage. Therefore, it is possible that multiple size trays that do not in any way correspond with one another may be used at a security area thus making storage of the trays when they are not in use cumbersome. A disadvantage to a non-standardized tray system is that when the trays are to be stored they may take up passenger access areas, thereby causing further waiting time as the security personnel moves the unused trays so that a person may pass through a passenger access area.

Further it is common that there are inadequately-sized trays for holding large items such as laptop computers, thereby increasing the chance of the computers being damaged by being placed on a conveyer belt without being placed in a tray through an x-ray machine. Also, the time taken to search for a possible adequately-sized tray creates inefficiency and extends the waiting time while a person is passing through a passenger access area.

Another disadvantage of the present system is that after the trays are used and the contents are empted the tray must then be brought to a separate area of the security area and there is no system for transporting, storing and organizing for easy access to these trays especially if there are large numbers of them, and since the trays may be of various sizes, they may be cumbersome to transport and take up an excessive amount of space.

A disadvantage to the prior system is that the trays which are being used typically are plain trays and do not utilize space provided on the trays to generate additional revenue such as revenue which can be derived from advert/sing on the trays.

There exists a need for a system for a security area for moving the trays from a starting position to an ending position which allows the trays to be efficiently utilized, gathered and stored to be later used again.

There is also a need for a standardized sizing of the tray to allow for easier transport of the trays when they are not is use and also to provide a cleaner aesthetic appearance.

There is a need for uniformity from airport to airport to assist in the movement of people through the security checkpoints and also in the security process itself.

SUMMARY OF THE INVENTION

The present invention may eliminate the above-described disadvantages and provide for the above-described needs by teaching, for example, a system and device for use in securing a facility, and more particularly, by teaching a tray cart system and tray that may be used to contain various objects that are processed through a scanning device.

One embodiment of the present invention may be a system including a security scanning device through which objects may be passed, having a proximate end and a distal end, a plurality of trays, and a plurality of tray carts adapted to receive the trays, wherein the plurality of trays are provided in a first tray cart at the proximate end of the scanning device, and wherein the trays are adapted to be passed through the scanning device at the proximate end, and wherein the trays are received in a second tray cart after passing through the scanning device at the distal end of the scanning device, and wherein the second cart is adapted to be relocated to the proximate end of the scanning device.

A further embodiment of the present invention may be such a system wherein the scanning device includes a device selected from the group consisting of a manual inspection station, an x-ray machine, a conveyor belt, and a particulate matter sensor. Another embodiment may be such a system wherein a plurality of the trays are nestable trays. A further embodiment may be such a system further including the step of substituting a third tray cart containing a plurality of trays for the first tray cart. Yet another embodiment may be such a system wherein the tray cart includes a roughly rectangular base having a bottom surface and a top surface, a plurality of wheels attached to the bottom surface, and a vertical positioning member attached to the top surface. Still another embodiment of the present invention may be such a system wherein the trays are adapted to display advertising on an interior bottom surface of the trays. Yet an additional embodiment of the present invention may be such a system wherein the plurality of trays are adapted to display a tag number.

An embodiment of the present invention may be a method including positioning a first tray cart containing trays at the proximate end of a scanning device through which objects may be passed, wherein the scanning device includes a proximate end and a distal end, removing a tray from the first tray cart, passing the tray through the scanning device from the proximate end through to the distal end, providing a second tray cart at the distal end of the scanning device, and receiving the tray passed through the scanning device in the second tray cart.

A further embodiment of the present invention may be such a method wherein the scanning device includes a device selected from the group consisting of a manual inspection station, an x-ray machine, a conveyor belt, and a particulate matter sensor. Another embodiment of the present invention may be such a method wherein a plurality of the trays are nestable trays. A further embodiment may be such a method wherein the nestable trays further comprise exposed sides capable of displaying advertising. Yet another embodiment of the present invention may be such a method wherein one or more of the tray carts is adapted to permit substantial visual inspection of a plurality of trays placed thereon.

A further embodiment of the present invention may be such a method wherein the tray carts are adapted to be rollable. Another embodiment of the present invention may be such a method further including the step of repositioning the second tray cart from the distal end to the proximate end. A further embodiment of the present invention may be such a method wherein a plurality of the trays are adapted to receive an item selected from the group consisting of a laptop computer, a video camera, a camera, a purse, a coat, a pair shoes, and an umbrella. Yet another embodiment of the present invention may be such a method wherein a plurality of the trays are adapted to receive an item selected from the group consisting of a cell phone, a pager, a wallet, a set of keys, and a personal digital assistant.

A further embodiment of the present invention may be such a method wherein one or more of the tray carts includes restraining walls that are substantially transparent. Another embodiment of the present invention may be such a method wherein one or more of the tray carts includes a tray platform further including a resilient member. A further embodiment of the present invention may be such a method further including the step of providing a third tray cart. Yet another embodiment of the present invention may be such a method further including the step of substituting a third tray cart containing a plurality of trays for the first tray cart. Still another embodiment of the present invention may be such a method wherein the trays are adapted to display advertising on an interior bottom surface of the trays. Yet an additional embodiment of the present invention may be such a method wherein the plurality of trays are adapted to display a tag number.

An embodiment of the present invention may be an apparatus for use as a tray cart for securing a facility including an approximately rectangular base having a bottom surface and a top surface, a plurality of wheels attached to the bottom surface of the base, and a vertical positioning member attached to the top surface of the base, wherein the vertical member includes at least one approximately C-shaped tubular member having a first end and a second end, wherein said first end and said second end are connected to said base. A further embodiment of the present invention may be such an apparatus wherein the apparatus is adapted to receive two differentially sized stacks of trays.

An embodiment of the present invention may be a tray for use in a security scanning system including, a base having a first surface and a second surface, four containing walls extending approximately vertically from the base, shock absorbing material on the first surface of the base, and wherein the one or more of the walls displays a tag number.

These and other features of the invention may be more fully understood by reference to the following drawings.

DETAILED DESCRIPTION OF THE INVENTION

It is to be understood that the present invention is not limited to the particular methodology, compounds, materials, manufacturing techniques, uses, and applications described herein, as these may vary. It is also to be understood that the terminology used herein is used for the purpose of describing particular embodiments only, and is not intended to limit the scope of the present invention. It must be noted that as used herein and in the appended claims, the singular forms "a," "an," and "the" include the plural reference unless the context clearly dictates otherwise. Thus, for example, a reference to "a tray" is a reference to one or more tray and includes equivalents thereof known to those skilled in the art. Similarly, for another example, a reference to "a step" or "a means" is a reference to one or more steps or means and may include sub-steps and subservient means. All conjunctions used are to be understood in the most inclusive sense possible. Thus, the word "or" should be understood as having the definition of a logical "or" rather than that of a logical "exclusive or" unless the context clearly necessitates otherwise. Structures described herein are to be understood also to refer to functional equivalents of such structures. Language that may be construed to express approximation should be so understood unless the context clearly dictates otherwise.

Unless defined otherwise, all technical and scientific terms used herein have the same meanings as commonly understood by one of ordinary skill in the art to which this invention belongs. Preferred methods, techniques, devices, and materials are described, although any methods, techniques, devices, or materials similar or equivalent to those described herein may be used in the practice or testing of the present invention. Structures described herein are to be understood also to refer to functional equivalents of such structures. All references cited herein are incorporated by reference herein in their entirety.

The present invention provides a tray and a system that can be used in security areas to provide efficient movement of loose items, laptop computers and electronic equipment from a starting point to an ending point. Specifically, the present invention may be used in an area such as an airport security checkpoint that may have a metal detector present that a person has to walk through. As the person walks through the security checkpoint they may have to remove such items such as wallets, keys, change and other small objects which are placed into a tray which is either then hand checked or placed through an x-ray machine separate from the metal detector. At the same time, if a person has a item such as a laptop computer or electronic equipment such as a video camera or digital camera, they are instructed to place such items into a larger size tray which is then passed through an x-ray machine and/or hand checked.

The present invention allows for a system of uniform sizing of the trays in which items are to be placed so that the trays may easily be stacked and transported after they are used. The trays also have specified areas to allow for advertising materials to be attached. These advertising materials may be changed as often as necessary so that different companies' advertisements can be represented on the trays without the need for manufacturing new trays.

In an alternative embodiment the advertising materials can be permanently attached to the trays. The trays can be a disposable type that are replaced after the advertisement becomes outdated or worn and a new tray is made.

The present invention has various sized trays which can be used to hold larger items such as cameras, laptop computers or purses and a second smaller size which can be used when items such as keys, wallets, cell phones, PDAs and watches are to be removed and placed in a tray for inspection.

The present invention also involves a system for transporting the trays and using the trays of the present invention from the starting point in the security checkpoint to the ending point in the security checkpoint. The system includes a first tray or cart that holds several empty trays in a organized stacked manner so that a tray can be removed when needed. The tray is then used by the user and passes through the security checkpoint. After the contents are taken out of the tray the empty tray is then inserted into a second rack that is identical to the first rack. The trays are then stacked in the second rack so that the empty trays are conveniently stored for later use. After the second rack is completely filled with empty trays the second rack can be moved to the position of the first rack, and the empty trays are ready to be used again as needed.

The present invention provides a cost effective way of providing security trays for a security checkpoint while at the same time generating revenue from the advertising that is contained thereon. Further, the present system provides an efficient system for moving the trays for use and removal after they are used.

Security checkpoints are both a time consuming and frustrating part of traveling for frequent fliers and people on vacation alike. The present invention provides a system of speeding up the process of processing people through these checkpoints to decrease the likelihood of delays for travelers. The present invention also has the advantage of increasing passenger flow through checkpoints and increasing traveler satisfaction due to the lack of delays.

Figure 1:
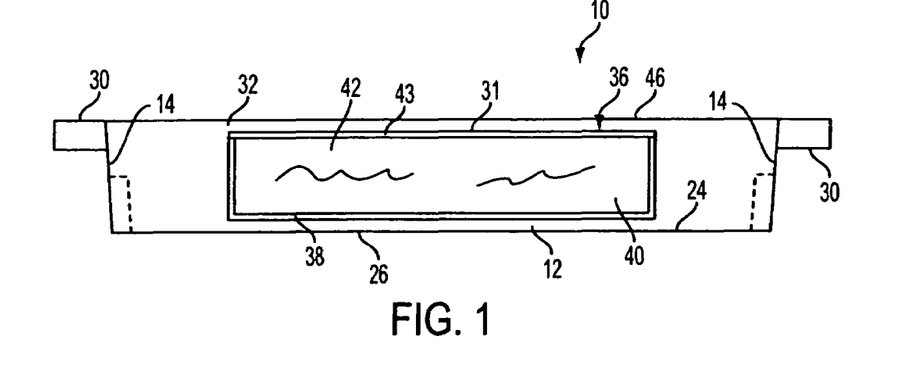
FIG. 1 is a side elevation view of a computer tray of the first embodiment.
Figure 2:
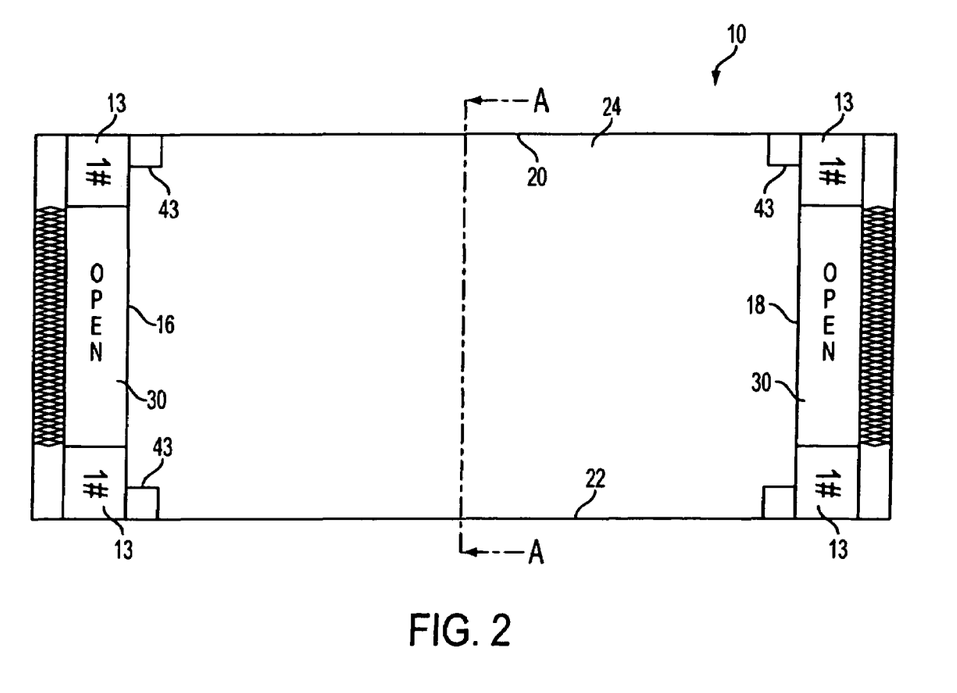
FIG. 2 is a top plan view of a computer tray of the first embodiment of the present invention.

Referring to FIG. 1, the side elevation view of a computer tray first embodiment is shown. The tray 10 has a base 12 having upwardly extending walls 14 extending therefrom. In a preferred embodiment, base 12 can have a rectangular or square shape. Referring to FIG. 2, there is a first wall 16 and a second wall 18 positioned substantially parallel to the first wall. The first wall 16 and second wall 18 are connected to each other by a substantially perpendicular third wall 20 and a fourth wall 22 parallel to the third wall 20. Referring to FIG. 1, the walls 14 terminate at an upper lip 46.

Referring to FIG. 2, attached adjacent the first wall 16 and second wall 18 can be an extended portion to form a handle 30 so that the tray can be easily moved by the user. The tray can be made of plastic by injection molding or in the alternative by stamping out of PVC or a similar material. However, any method of making the tray can be used. The tray can be made of a clear or translucent plastic if desired so that the contents in the tray can always be seen by the security personnel. However, any rigid material can be used to make the tray.

Figure 3:
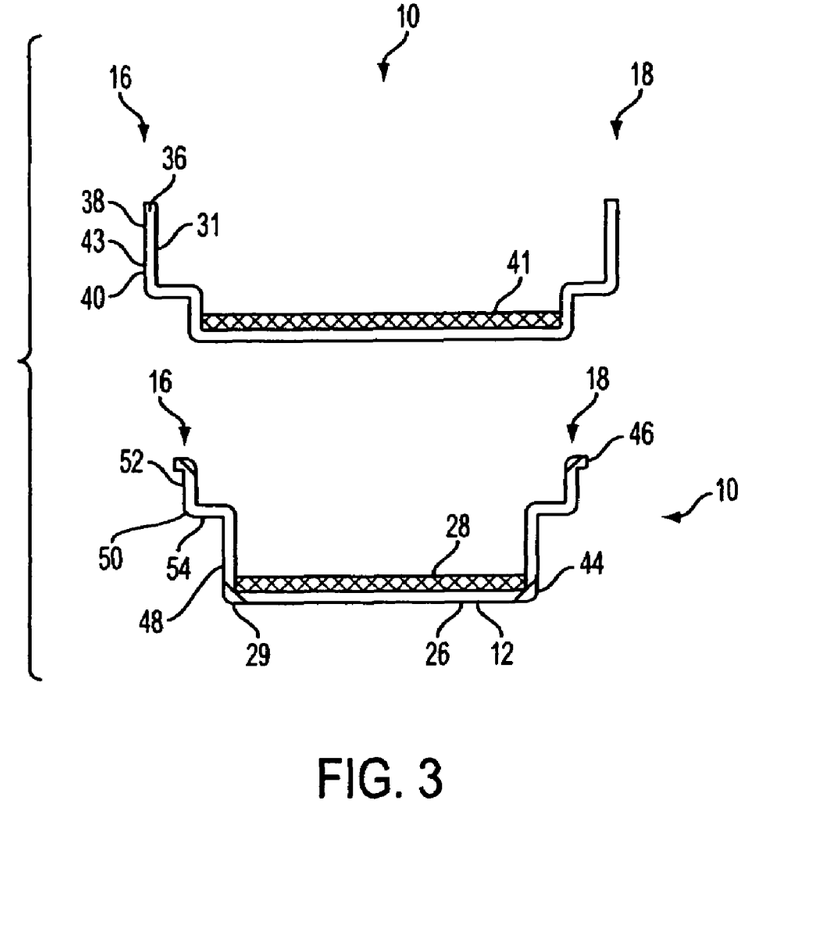
FIG. 3 is a cross-sectional view taken along line A-A of the embodiment of the computer tray embodiment as shown in FIG. 2.

Referring to FIG. 1, in a preferred embodiment the base 12 has a top surface 24 and a bottom surface 26. Referring to FIG. 3, the top surface 24 can have a padding material 28 positioned thereon so that any objects placed with the tray 10 are cushioned by the padding 28. Padding 28 can be of a rubber or neoprene type material to absorb any shock that the objects inside may experience when moving the tray 10. However, it is envisioned that any material which cushions and absorbs vibration can be used. The bottom surface 26 of the base 12 can have a non-marking material 29 placed thereon so that the tray 10 does not scratch or damage any surface which the tray 10 is placed upon. It is envisioned that both the top padding 28 and bottom padding 29 can be attached by using an adhesive, Velcro® or any other means provided that the padding is securely attached to the tray 10. In a more preferred embodiment on the top surface 24 of the base 12 it is envisioned that advertisement material 41 can be placed upon either the top surface 24 or on top of the padding 28. This advertisement can be held on by the use of a semi-permanent adhesive, clips or a Velcro® type attachment.

Referring to FIG. 3, in an alternative embodiment, the advertisement material 41 can be permanently attached to the top of the padding 28. The advertising material can be permanently imprinted on the padding 28 or (referring to FIG. 1) on the top surface 24 if a padding 28 is not used. It is envisioned that the advertisement can be permanently attached using either a permanent adhesive or another method of imparting a printing on the material such as sublimation or silk-screening. Referring to FIG. 3, it is also envisioned that the advertisement itself could be molded into the padding 28 or (referring to FIG. 1) the top surface 24 of the base 12.

Referring to FIG. 2, the tray 10 can also include an identification number 13 which is used to identify the specific tray 10 used by a specific person. It is envisioned that each tray 10 has its own identification number 13 that is unique to it, so that when a person places their items in the tray 10, it can later be easily identified as containing the items that the person put into it. In a preferred embodiment the identification number 13 can be located on the one of the (referring to FIG. 1) upstanding walls 14. However, (referring to FIG. 2) the number 13 can be located anywhere that is visible on the tray 10.

Referring to FIG. 1, in a preferred embodiment, positioned at each corner between each of the individual upstanding walls 14 is (referring to FIG. 2) an interior support post 43 at the corners. These support post 43 are preferably positioned adjacent the intersection of each wall and extend upwardly from the base 12. These posts 43 are used so that when multiple trays 10 are stacked inside one another the base 12 of a second tray placed inside of a first tray will rest upon the support posts 43 and not on the top surface 24 of the base 12. An advantage to this design is that the trays 10 will not become wedged between one another but instead are separated from one another by the height of the support posts 43 to allow the trays 10 to be easily separated. A further advantage to these support posts 43 is that since the support post 43 is connected to the base 12 and the walls 14 in which they attach, they provide additional strength and support to the walls 14 and the joints created at their intersections.

Referring to FIG. 2 it is envisioned that the first wall 16, second wall 18, third wall 20 and fourth wall 22 can each include (referring to FIG. 1) a window 36 on the outer surface 32 opposite the inner surface 34 of each wall. The window 36 is used so that a advertisement 42 can be placed within the window 36 so that people using the tray 10 and the people passing through the security checkpoint will be able to see the advertisement 42. In a preferred embodiment, the window 36 can be formed on the outer surface 32 of each of the walls 14, however, for exemplary purposes the structure of the window 36 on the third wall 20 will be described in detail with the remaining walls having the same structure.

The window 36 has an inner recess 40 that is created by the outer surface 32 of the first wall and an outer cover 38 that is attached over the first wall 16 outer surface 32. The outer cover 38 can be made of a transparent or translucent material depending on the user's needs. It is envisioned that a portion of the peripheral edge of the window 36 is either adhesively or molded into the outer surface 32 of the first wall 16, however, an open portion 31 is allowed to remain so that an advertisement 42 can be placed in the recess 40. Between the outer surface 32 and the outer cover 38 the inner recess 40 is formed which is sized to allow an advertisement material 42 to be placed within the inner recess 40. The advertisement 42 can be made of a thin paper-like material or any other material such as a plastic or metal provided that it fits within the inner recess 40. The advertisement 42 is preferably of flat configuration and has an outer surface having printing thereon with this side being positioned adjacent the outer cover 38 so that it can be seen through the transparent or translucent outer cover 38. It is envisioned that a seal 43 can be placed above the inner recess 40 to close off the space between the outer cover 38 and the outer surface 32 to prevent the advertisement 42 from falling out of the inner recess 40. The seal 43 can have a hinged type construction that allows the seal 43 to be selectively moved to either prevent or allow material to be removed from the inner recess 40. The seal 43 is also envisioned to be a removable friction type material such that it can be removed when needed but does not easily fall out of the recess 40.

An advantage of the present invention is that various advertisements 42 can be easily interchanged in the windows 36 when needed because the advertisements are not permanent.

In an alternative embodiment, the advertisement 42 can be permanently attached to any of the walls of the tray. It is envisioned that the advertisement 42 can be permanently attached to (referring to FIG. 2) the first wall 16, second wall 18, third wall 20 or the fourth wall 22. Referring to FIG. 1, the advertisement 42 can be permanently attached so that inadvertent removal of the advertisement can be prevented. It is envisioned that the advertisement can be silk-screened or imprinted on the outer surface of the tray. After the tray has been used, and if the advertisement 42 has been worn partially away, the tray can be disposed of and a new tray can be created having either the same advertisement or a different advertisement.

An advantage to the alternative embodiment of a permanent advertisement 42 being attached to the tray is that new trays are constantly being made as the older trays are either used or worn. These trays can be of a disposable variety and can be recycled after they are no longer used. Another advantage to the alternative embodiment of the present invention is that the recycling of trays constantly provides a clean and uniform look to all checkpoint areas since the trays that are being used are in good condition.

Figure 4:
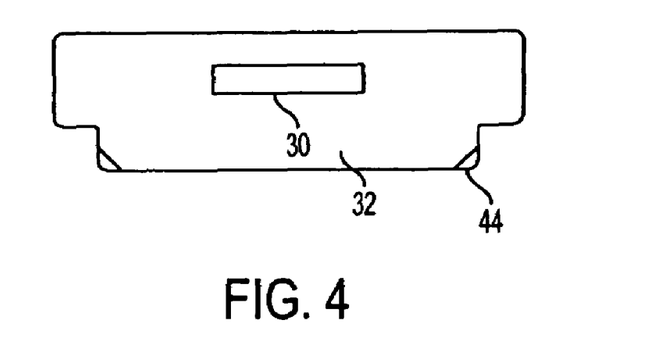
FIG. 4 is a side elevational view of the computer tray in a first embodiment.

FIGS. 3 and 4 show how the first wall 16 and second wall 18 have an indentation 54 formed in each wall. First wall 16 and second wall 18 are constructed of a first section 48 which extends upward from the base 12, a second section 50 which is substantially perpendicular to the first section 48 at a first end 49 connected to a third section 52 at a second end 51 with the third section 52 being substantially perpendicular to the second section 50 and in a parallel plane to the first section 48. The first wall 16 and second wall 18 are made of these three sections so that the trays can be easily stacked within one another. The horizontal second section 50 and the first section 48 form the actual indentation 54 itself.

Figure 5:
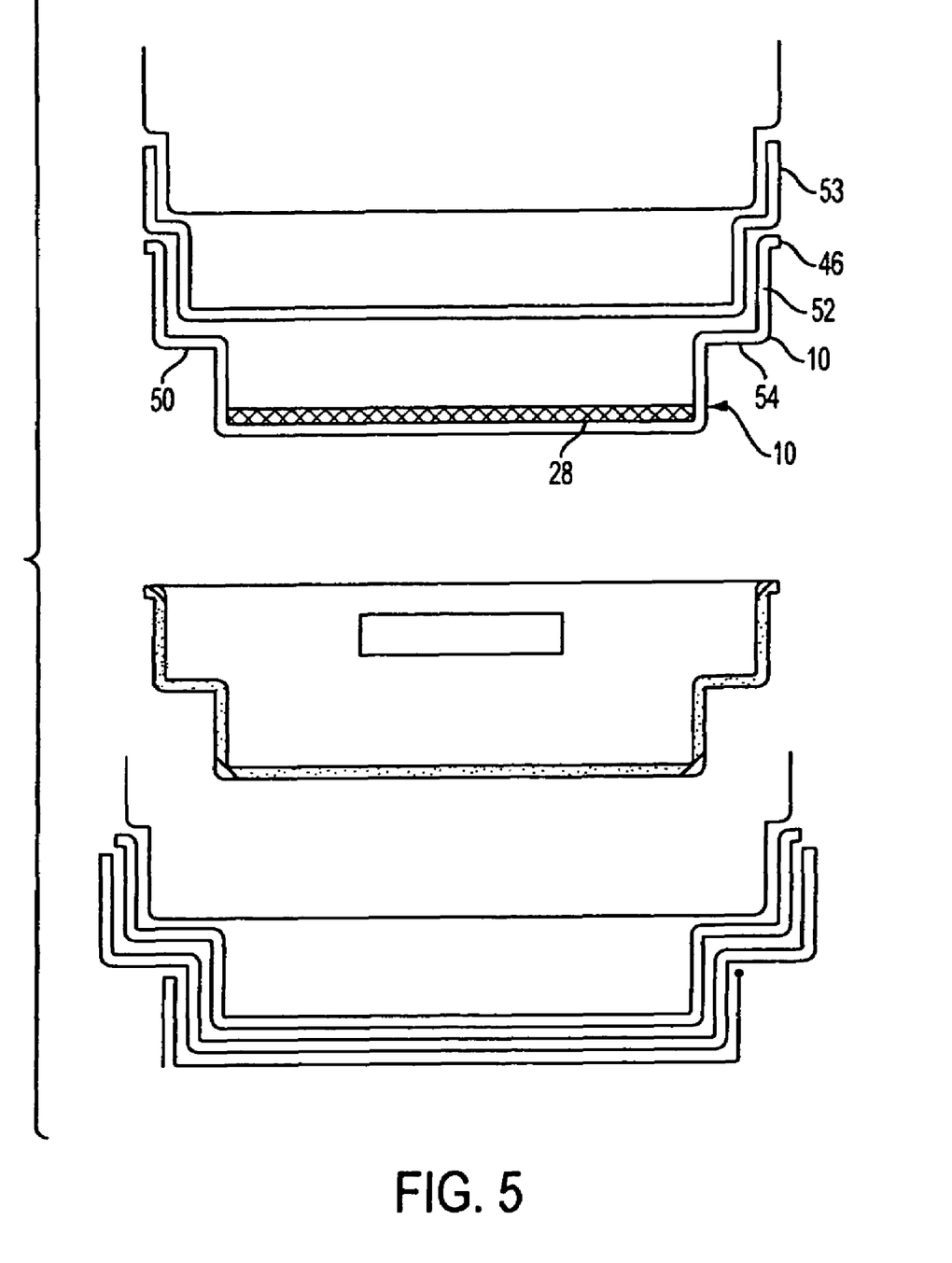
FIG. 5 is a cross-sectional view showing the first embodiment in a nesting position.

FIG. 5 shows how the trays 10 are nested within one another and how the third section 52 has terminates at an upper lip 46. The upper lip 46 of the third section 52 contacts the second section 50 of a second tray 53 when a first tray 10 and second tray 53 are placed within one another.

An advantage of this nesting system is that when the trays are not being used, they can be easily be stacked for storage and used at a later time. A further advantage of the nesting system is that since the advertisements are on the outer surface of the tray the advertisements can be seen at all times thereby increasing the visibility of the advertising to potential consumers which are the people being processed through the security checkpoint.

Figure 6:
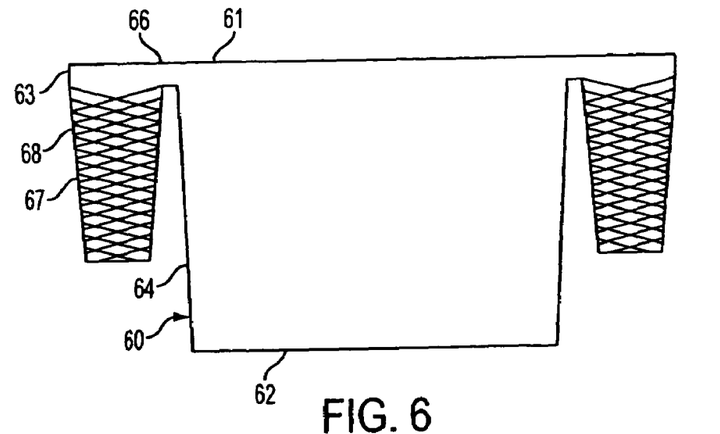
FIG. 6 is a side elevational view of a smaller tray of the present invention.
Figure 7:
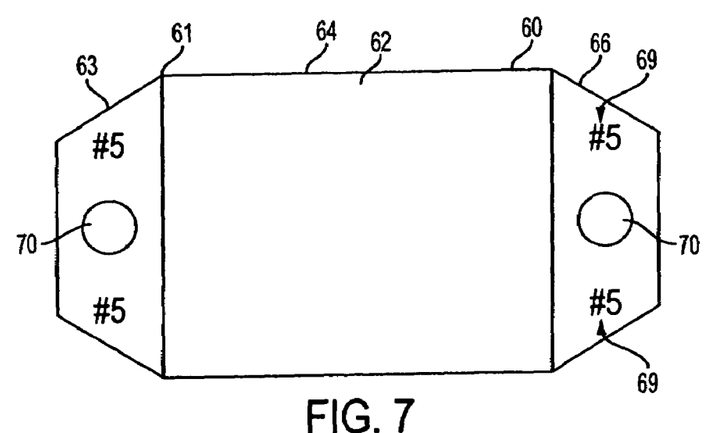
FIG. 7 is a top plan view of a third embodiment of the present invention.

An alternative embodiment of the tray is shown in FIG. 6. The second embodiment is a smaller tray for items such as keys, change, cell phones, PDAs and wallets. The second embodiment 60 has a base 62 having upstanding walls 64. The upstanding walls 64 terminate at a second part 66, which is preferably perpendicular to the upstanding walls 64. The second part 66 has first end 61, which is connected to the upstanding walls 64 and extends away from the upstanding wall 64 to a second end 63 which is connected to an extension 68. The extension 68 preferably extends toward the base 62 either partially or completely the distance to the base 62. The extension 68 is sized to allow for a window 67 to be placed thereon. The construction of the window 67 is similar to the window 36 used in the first tray 10, except that it is smaller in construction to fit on the second tray 60. Referring to FIG. 7 a top plan view of the second embodiment 60 is shown. An aperture 70 is used as a grip portion on the second part 66 to allow a user to place their fingers within these holes to securely grip the tray 60. An identification number 69 that is unique to each tray 60 can be located on the second part 66 so that the tray 60 can later be identified as being used by a particular person.

Figure 8:
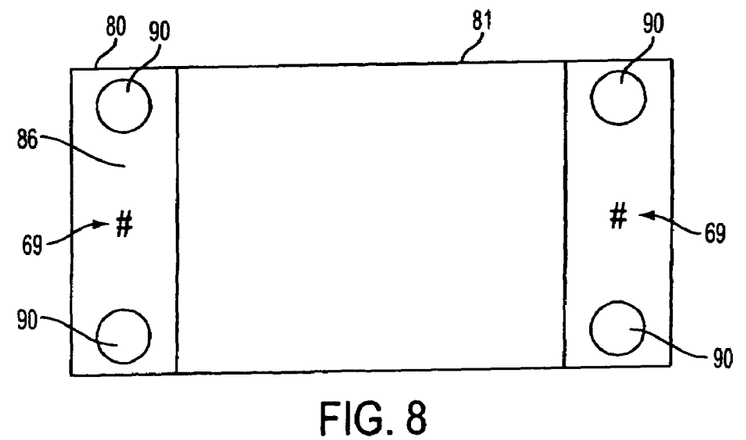
FIG. 8 is a top plan view of a fourth embodiment of the present invention.

Referring to FIG. 8, a third embodiment 80 is shown which has the same general shape and construction as the second embodiment tray 60. The difference in the third embodiment is that several apertures 90 are positioned on a second part 86 at each of the four corners of the tray 80. An advantage to this design is that a user can securely grip the tray 80 using any of these apertures 90 to move the tray 80 to the desired area. It is envisioned that this third embodiment 80 can use on its side wall 81 a similar window 36 as in the first embodiment 10, therefore, it will not be described in detail.

Figure 10:
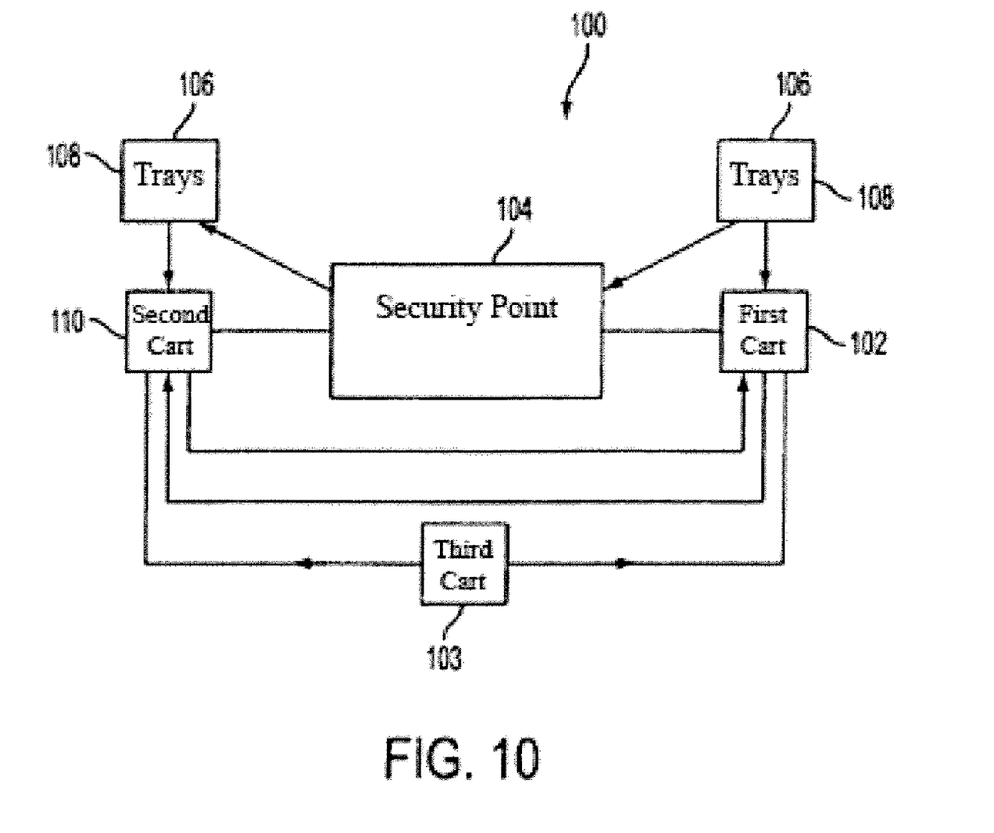
FIG. 10 is a schematic of the system of the present invention.

Referring to FIG. 10, a system of the present invention using the trays described earlier will now be described in detail. The system of the present invention includes using of a first cart 102 at a starting point before the security point 104, using trays 106 and 108, and the using of a second cart 110 which is identical to the first cart 102. As a person enters the checkpoint, they are told by security personnel to put any of their carry on baggage or electronic items, such as laptop computers, onto the conveyer belt to be processed through the x-ray machine. With the present invention, a laptop computer is placed by the person being searched into a larger tray 108, which is sized to fit around the laptop computer so that it is not damaged as it is passing over the conveyer belt and through the x-ray machine. The person is then usually asked by security personnel to remove any loose items and bags and place them in either a smaller tray 106 or a larger tray 108 as previously described depending on the side of the items which are to be searched. A first cart 102 is placed prior to the security point where the user is then asked to remove such items. The first cart 102 is constructed so that it holds the trays 106 and 108 in a stacked position so that the empty trays can easily be taken out of the cart 102 and given to the person. After the person has put the various items into the trays 106 and 108 they are given back to the security personnel who then searches the items. The user then proceeds through the security point 104. Typically in an airport or other area the security point will be a through the security point 104 and at a later time receive the trays 106 and 108 which they placed their items into prior to passing through the security point 104 and be told to take their items out of the trays 106 and 108 and proceed out of the security area. After the person has empted the items out of the trays, they can be placed in a second cart 110 which is identical to the first cart 102. The empty trays 106 and 108 are stacked in a specific area of the cart 110 so that the trays can later be used again.

After the second cart 110 is completely filed with empty trays 106 and 108, the second cart 110 can be moved to the position of the first cart 102 prior to the security point 104 and provide empty trays for people going through the security point 104. After the first cart 102 is depleted of trays 106 and 108 the first cart 102 can be moved to the location of the second cart 110 to then receive empty trays at the end of the security point 104. The rotation of the security carts 102 and 110 and the trays 106 and 108 creates an efficient and convenient way to transport the trays from the beginning to the end of the security point 104.

It is envisioned that a third cart 103 can be used in addition to the first cart 102 and the second cart 110. The third cart 103 can be used as a back up or spare cart with empty trays 106 and 108 contained within it to be placed in the position of the first cart 102 when needed to further speed up the process of providing trays to people going through the security checkpoint. The third cart 103 can also be used in addition to the second cart 110 as an area to place the empty trays 106 and 108 after they are used. The use of the third cart 103 further facilitates the flow of the trays 106 and 108 from the beginning to the end of the security checkpoint such as times when peak travel and passenger volume is experienced at an airport security checkpoint.

Figure 9:
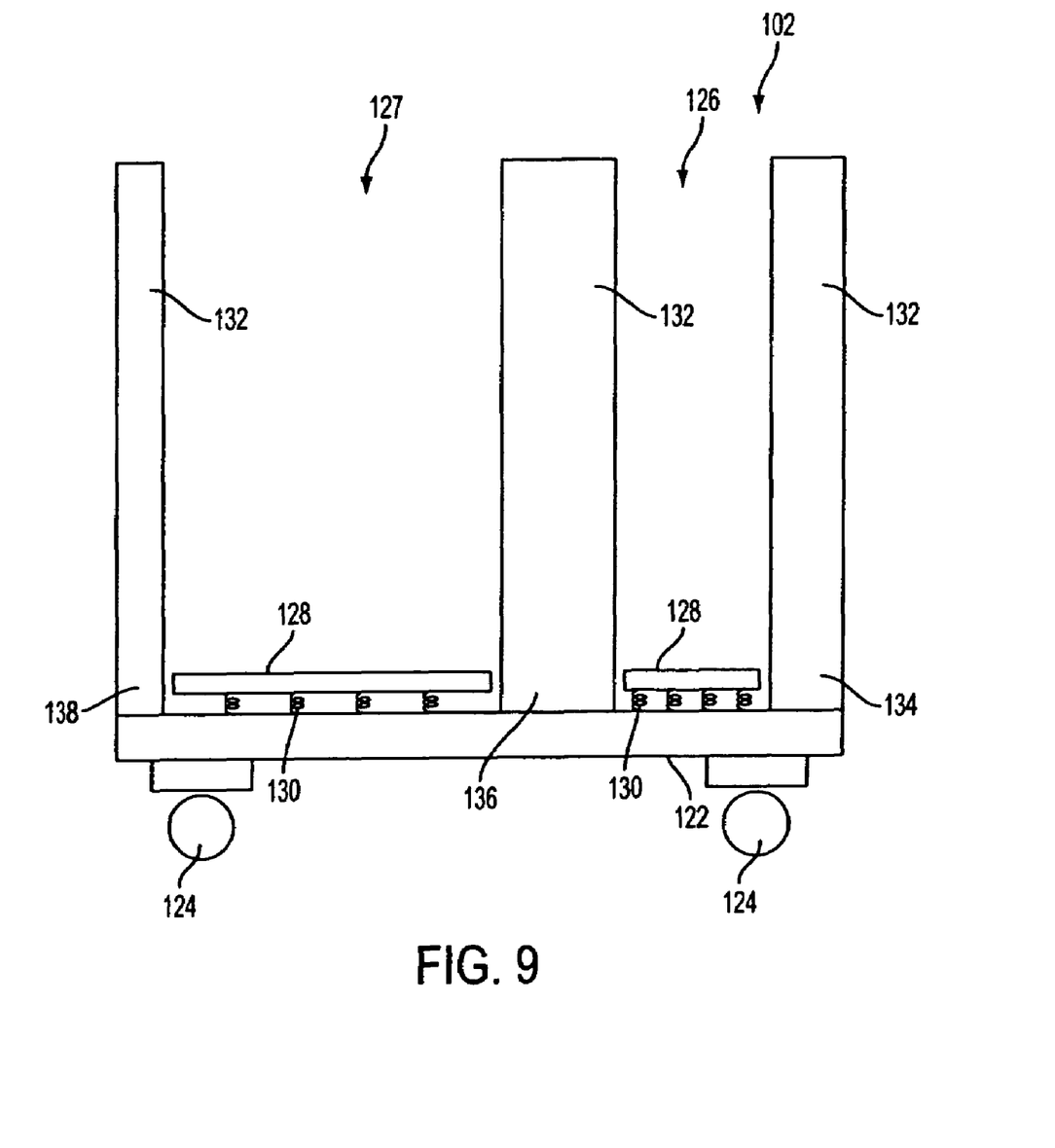
FIG. 9 is a side elevational view of a storage cart to be used with the present invention.

Referring to FIG. 9, a first cart 102 will be described in detail. The first cart 102 has base 122 preferably having wheels 124 attached to the bottom surface thereon. In a preferred embodiment the base 122 has a rectangular or square shape with the wheels 124 placed at each corner of the base 122. The base 122 has several walls 132 extending upwardly from the base 122 opposite the wheels 124. The walls 132 in a preferred embodiment can be made of a clear plastic or a metal material such as steel for durability, however, it is envisioned that plastic or any other material that is rigid can be used. The walls 132 are spaced apart from each other to form a first tray recess 126 and a second tray recess 127. The first tray recess 126 is used for holding the smaller trays 106 and the tray recess 127 is used for holding the larger trays 108. Each of the recesses are constructed so that the trays 106 and 108 can be placed within the recesses so that they do not fall out of the cart 102 and can be transported. In a preferred embodiment, both tray recesses 126 and 127 have platforms 128 at the lower end thereof adjacent the base 122. The tray platforms 128 are supported by resilient members 130 that are attached to both the base 122 and the tray platforms 128. The resilient members 130 can be metal springs or any other resilient material such as plastic or rubber. The tray platforms 128 and the resilient members 130 are used to support the trays 106 and 108 that are placed within the tray recesses 126 and 127. It is envisioned that in an alternative embodiment tray platform 128 may not contain resilient members of 130 and that the trays 106 and 108 themselves will rest upon the platform 128. In a more preferred embodiment, the walls 132 of the cart 102 are divided into a first wall 134 and a second wall 136 that forms tray recess 126. The recess creates a vertical column that allows the trays to be easily inserted into and out of the top of the cart 102 when needed thus providing a convenient and organized way of stacking the trays 106 and 108 in the cart 102. The second wall 136 and a third wall 138 form the second tray recess 127. The second tray recess 127 is similar to the first tray recess 126 except that the spacing between the second wall 136 and the third wall 138 is different than the spacing between the first wall 134 and second wall 136 to allow the differently sized trays to fit within the second recess 127.

The second cart 110 is an identical cart to the first cart 102, therefore, it is not described in detail.

An advantage to the present system is that the first cart 102 and second cart 110 are identical carts, thus when one cart is completely filled it can be moved to the proper location where needed. In the alternative, when one cart is completely erupted it can be moved to the appropriate area to be later filled with trays 106 and 108.

Furthermore, when there is a high volume of people being processed through the checkpoint, a third cart 103 can be used to hold the trays 106 and 108 to further speed up the movement of the trays 106 and 108 from the end point of the security checkpoint to be transported to the starting point of the security checkpoint.

Figure 11:
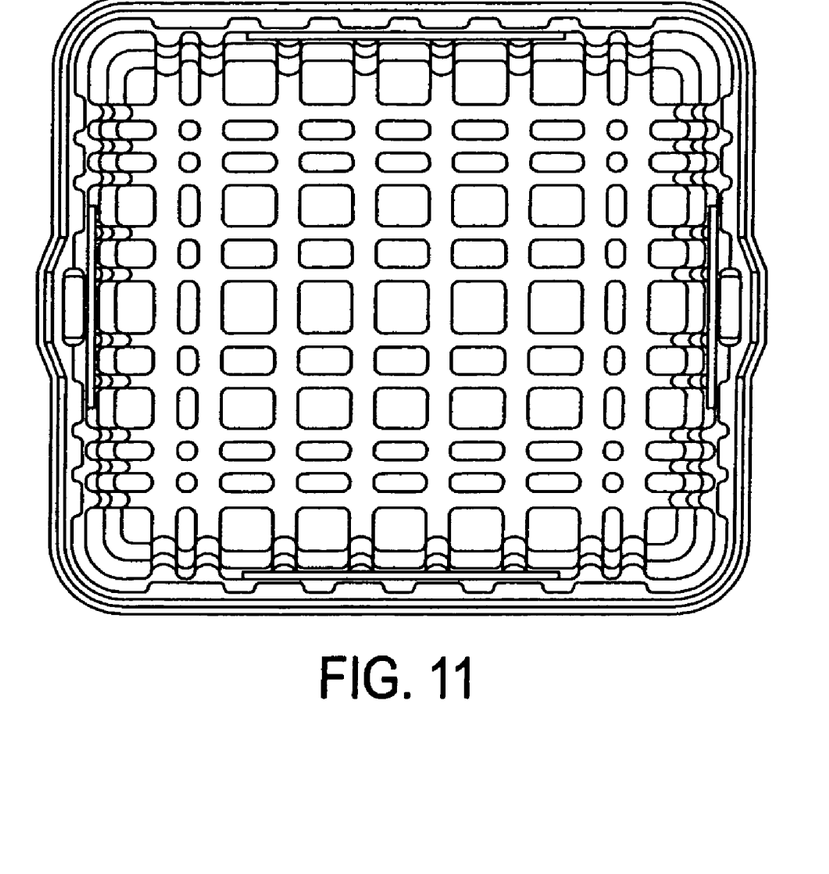
FIG. 11 is a top plan view of a fifth embodiment of the present invention.

FIG. 11 is a top view diagram of a fifth embodiment of the present invention. In this embodiment the overall width may be about 21.61 inches and the interior width measure from (referring to FIG. 3) one first section 48 to the opposite first section 48 may be about 15.81 inches. In FIG. 11, the overall vertical length may be about 13.81 inches.

Figure 12:
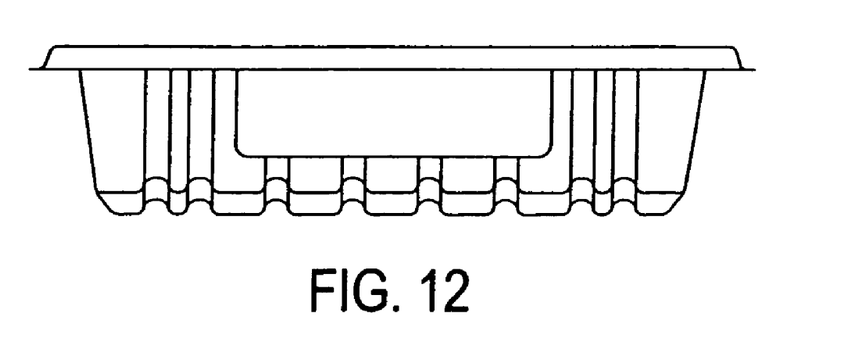
FIG. 12 is a front elevational view of a fifth embodiment of the present invention(a rear view of this embodiment may be a mirror image of the front elevational view).

FIG. 12 is a side view diagram of a fifth embodiment of the present invention. The vertical height of this embodiment may be about 5.0 inches and the height of (referring to FIG. 1) handle 30 may be about 0.63 inches.

Figure 13:
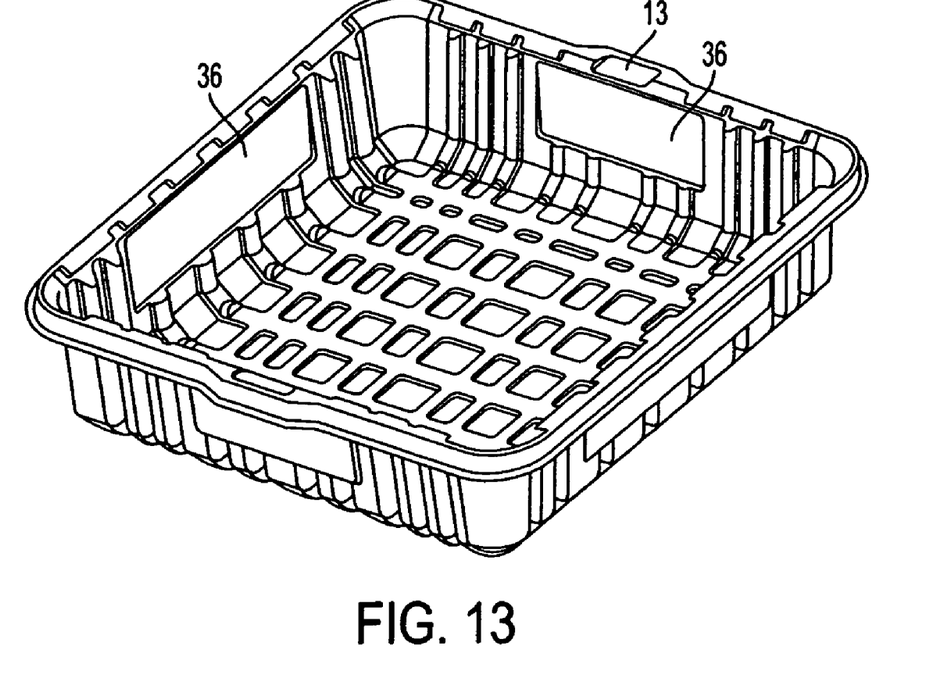
FIG. 13 is a top perspective view of a fifth embodiment of the present invention.

FIG. 13 is a perspective view of the fifth embodiment of the present invention illustrating the placement of a tag number 13 and advertising windows 36.

Figure 14:
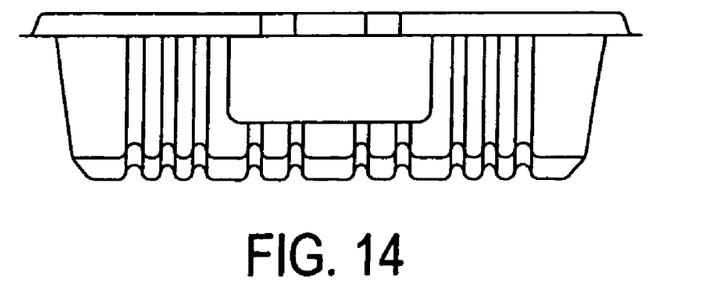
FIG. 14 is a left side elevational view of a fifth embodiment of the present invention (a right side view of this embodiment may be a mirror image of the left side elevational view).

FIG. 14 is an end view of the fifth embodiment of the present invention. It may be similar in appearance to a side view of the same embodiment.

Figure 15:
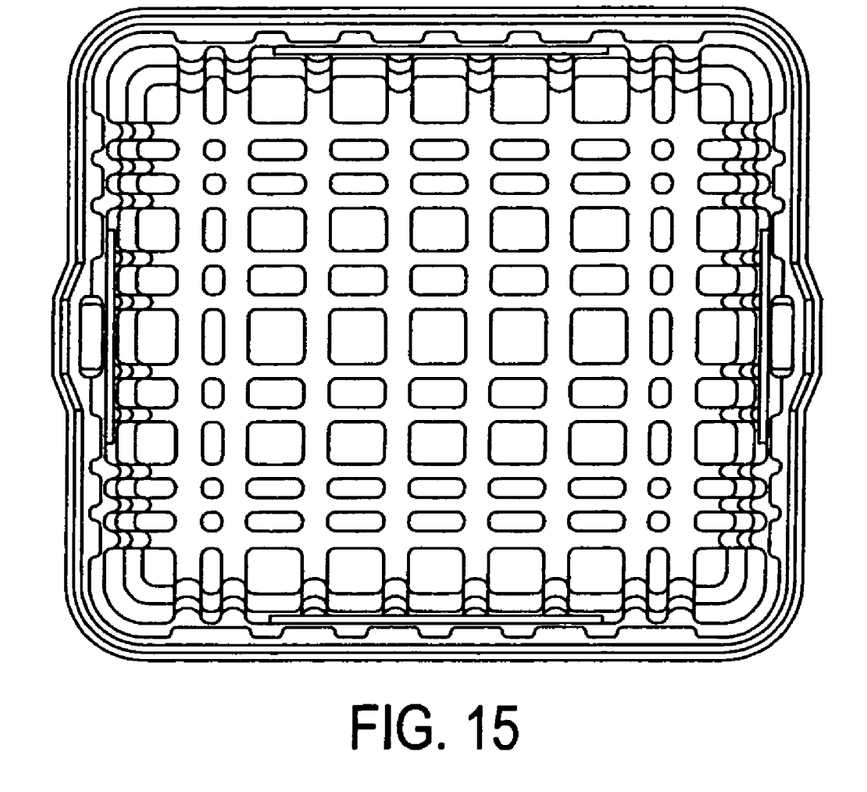
FIG. 15 is a top plan view of a sixth embodiment of the present invention.

FIG. 15 is a top view diagram of a sixth embodiment of the present invention. In this embodiment the overall width may be about 13.00 inches and the interior width measure from (referring to FIG. 3) one first section 48 to the opposite first section 48 may be about 8.81 inches. In FIG. 15, the overall vertical length may be about 12.00 inches.

Figure 16:
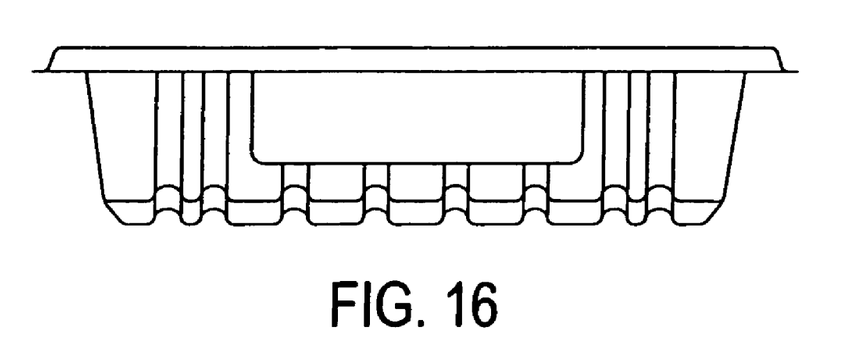
FIG. 16 is a front elevational view of a sixth embodiment of the present invention (a rear view of this embodiment may be a mirror image of the front elevational view).

FIG. 16 is a side view diagram of a sixth embodiment of the present invention. The vertical height of this embodiment may be about 5.0 inches and the height of (referring to FIG. 1) handle 30 may be about 0.63 inches.

Figure 17:
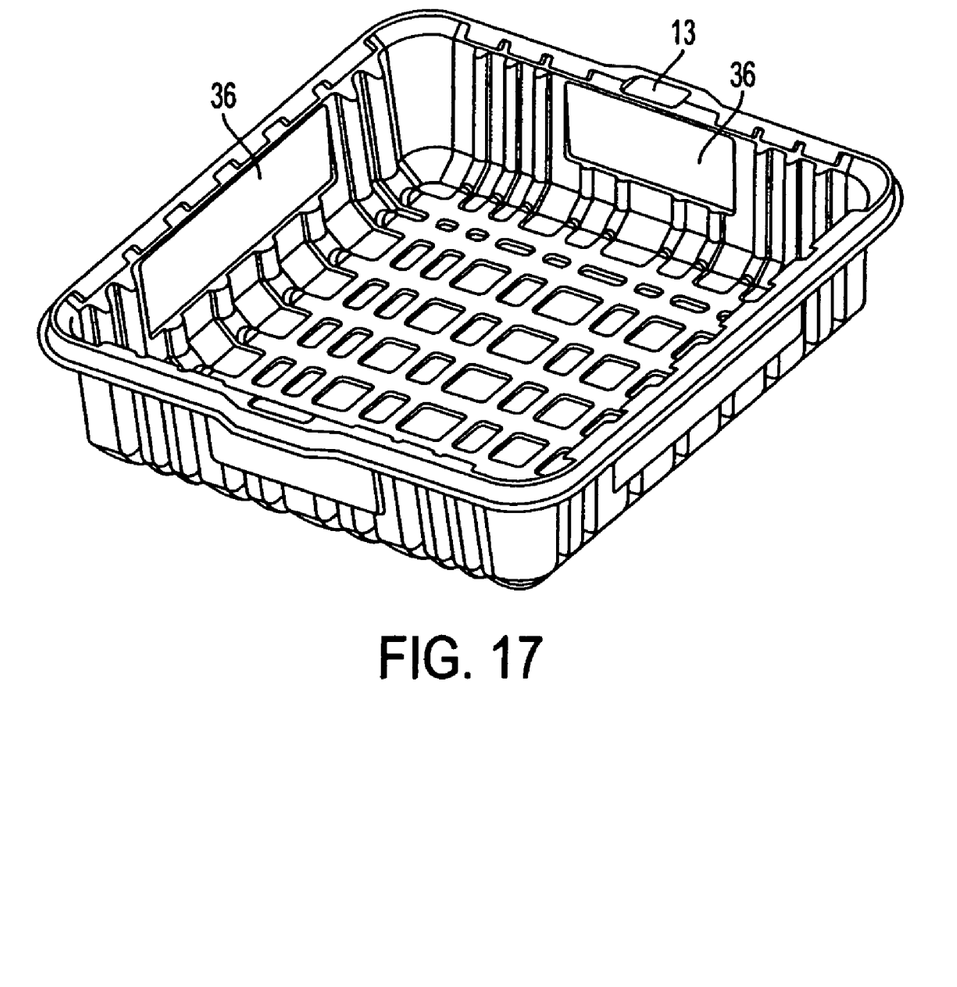
FIG. 17 is a top perspective view of a sixth embodiment of the present invention.

FIG. 17 is a perspective view of the sixth embodiment of the present invention illustrating the placement of a tag number 13 and advertising windows 36.

Figure 18:
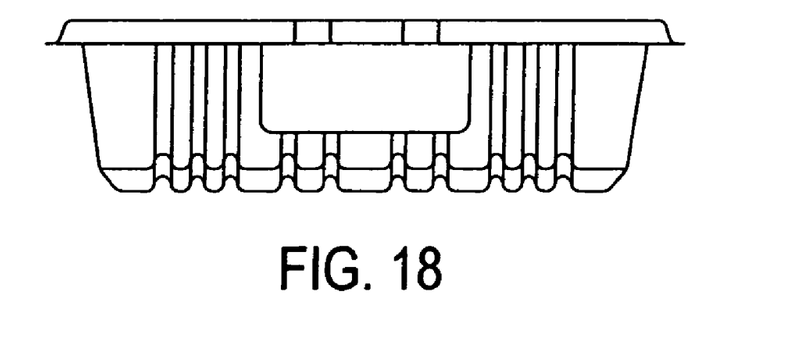
FIG. 18 is a left side elevational view of a sixth embodiment of the present invention (a right side view of this embodiment may be a mirror image of the left side elevational view).

FIG. 18 is an end view of the sixth embodiment of the present invention. It may be similar in appearance to a side view of the same embodiment.

Although the illustrated embodiments of the present invention have been described herein with reference to the accompanying drawings, it is understood that the invention is not limited to those precise embodiments and that various other changes and modifications may be effected thereon by one skilled in the art without departing from the scope or spirit of the invention, and that it is intended to claim all such changes and modifications as fall within the scope of the invention.

What is claimed is:

1. A method comprising:
    positioning a plurality of trays at the proximate end of a scanning device through which objects on the trays may be passed for scanning, wherein said scanning device comprises a proximate end and a distal end;
    said trays each comprises a unique identification tag allowing a user to visually identify ownership of objects on the trays;
    providing a tray from said plurality of trays and placing at least one object thereon,
    wherein said tray and at least one object are passed through said scanning device from said proximate end through to said distal end;
    receiving said tray and at least one object, after being passed through said scanning device, at the distal end of said scanning device; and
    moving said tray and at least one object from said distal end of said scanning device to said proximate end of said scanning device, and after emptying the tray, placing it with said plurality of trays so that said tray can be passed through said scanning device at said proximate end again, and
    wherein said trays comprise advertising displayed on said trays.

2. The method of claim 1, wherein said advertising is printed onto the interior bottom surface of said trays.

3. The method of claim 1, wherein said advertising is displayed on a padded insert that is placed on the interior bottom surface of said trays.

4. The method of claim 3, wherein said padding in said padded insert comprises padding selected from the group consisting of rubber, neoprene, and foam.

5. The method of claim 3, wherein said padded insert is securely fastened tote interior bottom surface of said trays.

6. The method of claim 3, wherein said padded insert is securely fastened to the interior bottom surface of said trays by a means selected from the group consisting of adhesive, glue, tape. Velcro®, clips, and rivets.

7. The method of claim 1, wherein said tray further comprises one or more of the group consisting of a unique tray identification number.

8. The method of claim 7, wherein said unique tray identification number is x-ray readable.

9. The method of claim 7, wherein said unique tray identification number is located on one of the upstanding walls of said trays.

10. The method of claim 7, wherein said unique tray identification number is recorded on a bar code.

11. The method of claim 7, wherein said unique tray identification number can be read through said scanning device.

* * * * *